Sept. 11, 1923.
C. T. SCHROYER
1,467,396

FRYING MACHINE

Filed Aug. 29, 1922 2 Sheets—Sheet 1

Inventor
Chas. T. Schroyer

By A. M. Freeman
Attorney

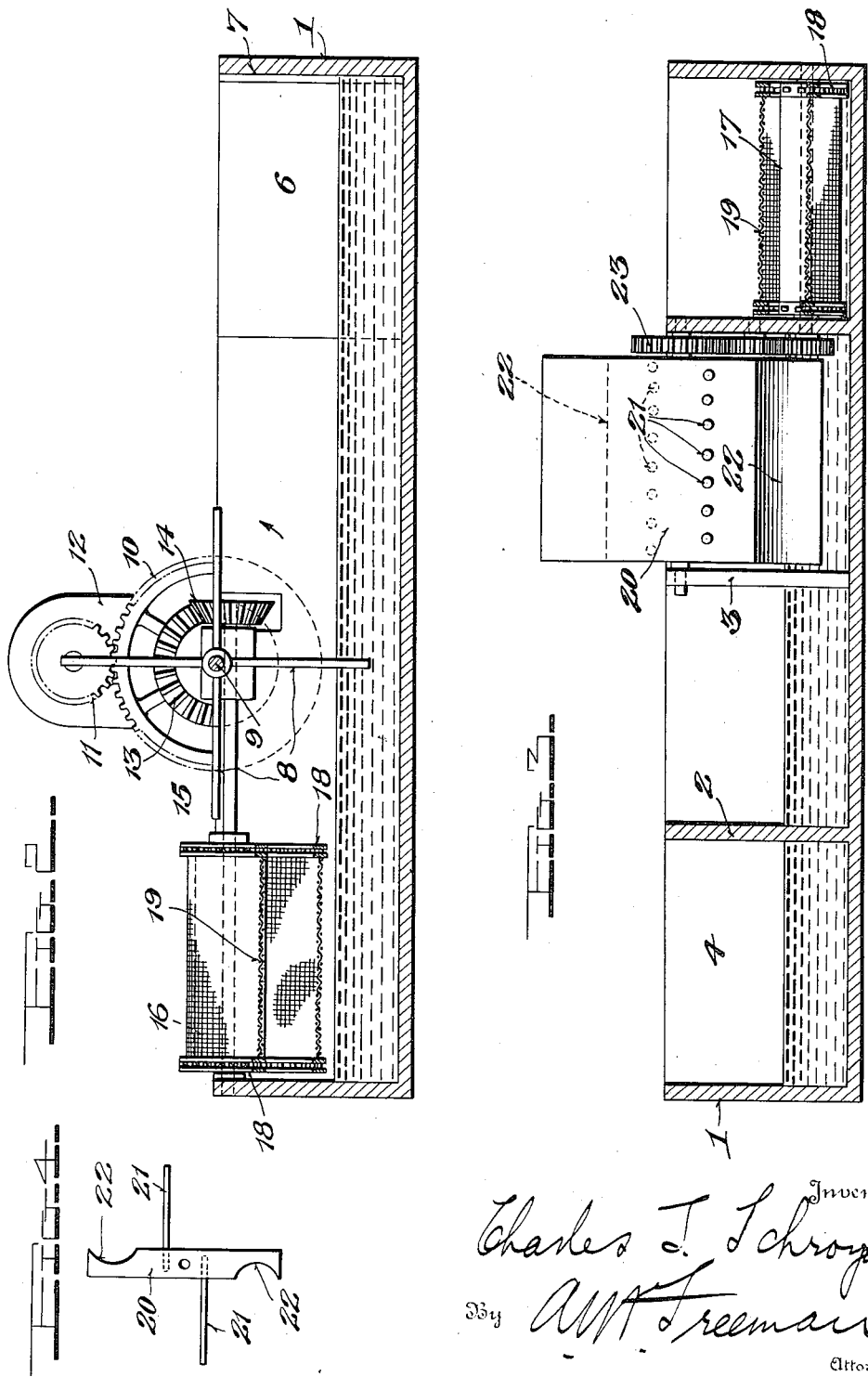

Patented Sept. 11, 1923.

1,467,396

UNITED STATES PATENT OFFICE.

CHARLES T. SCHROYER, OF SIOUX FALLS, SOUTH DAKOTA.

FRYING MACHINE.

Application filed August 29, 1922. Serial No. 585,055.

*To all whom it may concern:*

Be it known that CHARLES T. SCHROYER, a citizen of the United States, residing at Sioux Falls, in the county of Minnehaha and State of South Dakota, has invented certain new and useful Improvements in Frying Machines, of which the following is a specification.

This invention relates to certain new and useful improvements in a frying machine and more especially to a machine for frying potato flakes or slices, fried cakes, etc., and it has for an object to provide a simplified construction embodying a continuous channel through which a current of hot grease is propelled.

Another object of the invention is to provide a propeller arrangement journaled above the surface of the hot frying liquid whereby the slices, chips or cakes, will be carried on top of the grease instead of being submerged.

A further object is to provide improved means for arresting and turning over the food products when they are done on one side to thereby present the cooking grease to the other side of the food product, and thereby enable a thorough and equalized cooking of the food on opposite sides.

Further, the invention resides in improved means for removing the food product from the stream of frying liquid, and also in the features of construction and the arrangements and combinations of parts hereinafter described and claimed, reference being made to the accompanying drawing, wherein:

Figure 2 is a section on line 2—2 of Figure 1,

Figure 3 is a section on line 3—3 of Figure 1, and

Figure 4 is an end view of the turn-over device.

Figure 1:
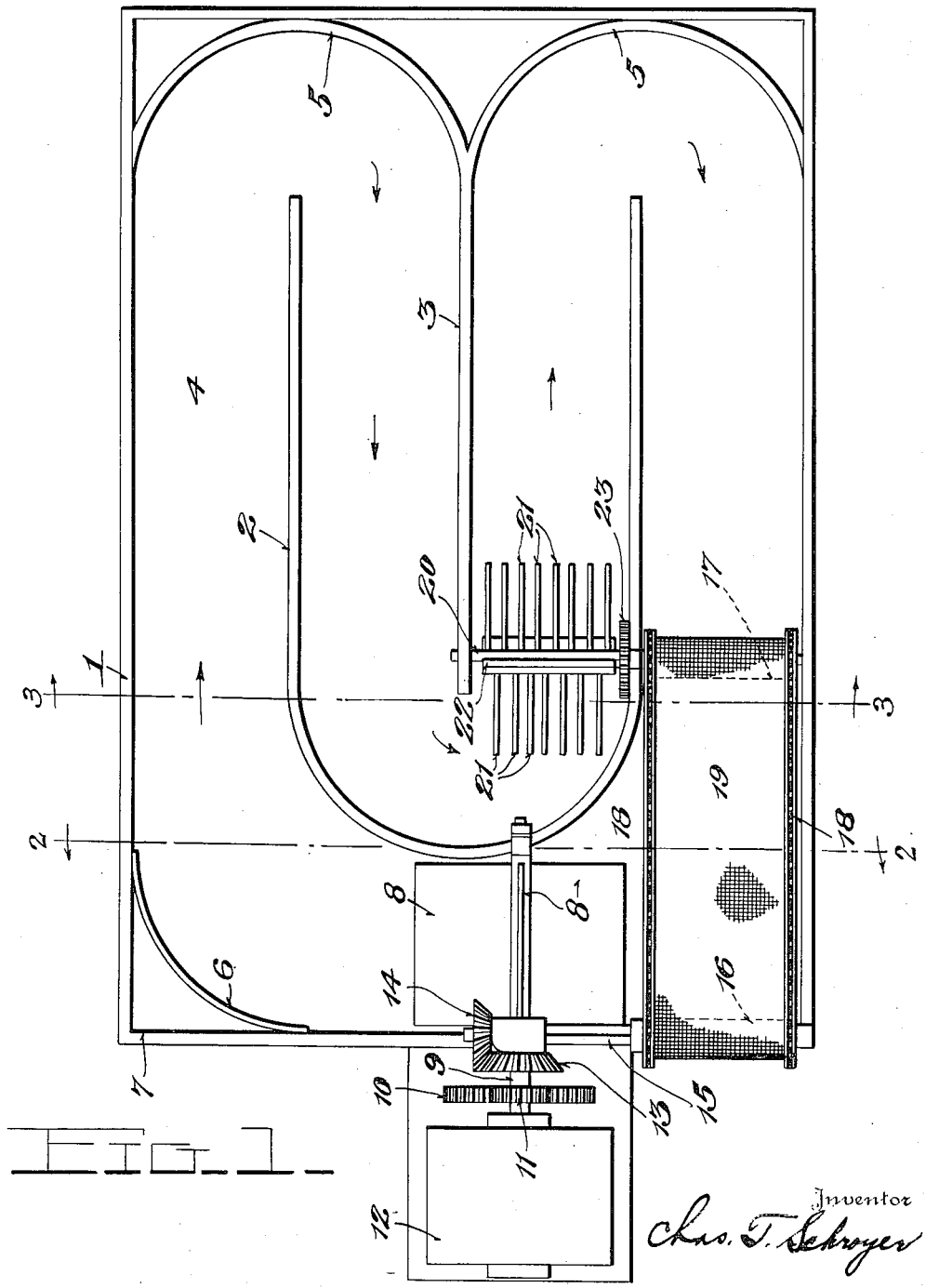
Figure 1, is a plan view of my improved machine.

Referring more in detail to the accompanying drawing, the numeral 1 designates a tank divided by a U-shaped partition wall 2 and a substantially T-shaped partition wall 3 into a continuous, zig-zag course or one way 4, the stem of the T-shape wall 3 extending between the parallel arms of the U-shape wall, while the cross arm of the T-shape wall comprises two arcuate arms 5 which form curved walls about the opposite end of the U-shaped wall. This construction eliminates sharp corners or pockets into which the food products might become lodged or momentarily rest and thereby become overdone. For similar reasons an arcuate wall 6 is provided adjacent the corner 7 at which point the slices of potato, doughnuts or other food products are dropped in any desired manner.

Journaled on the wall of the tank 1 and the wall 2 is a liquid impelling or propelling wheel 8 having its paddles or blades dipping into the liquid or hot grease when moving through the lower arc of their rotary movement. The shaft 9 of the paddle wheel 8 is extended outwardly and equipped with a large gear 10 with which meshes a smaller driving gear 11 mounted on the shaft of a suitable drive such as an electric motor 12. Also on shaft 9 is fixed a beveled gear 13 having mesh with a similar gear 14 which is fixed to a transverse shaft 15, the latter carrying a roller 16 journaled in bearings above the tank 1. A second roller 17 is journaled in the tank wall and partition wall 2 beneath the surface of the hot grease. These two rollers are interconnected by a pair of drive chains 18 taking over sprockets carried by the rollers, and between this pair of chains is an endless belt of wire mesh or other foraminous body 19.

A turn-over device is mounted on a shaft 20, journaled in the partition walls 2 and 3, and comprises oppositely extending series of fingers 21 radiating from the shaft in parallelism. At the base of these fingers, and secured to the shaft 20, are arresting devices 22 which extend parallel to the shaft and are designed to arrest the chips or food products in their travel until the turn-over fingers rise beneath them to turn the food products over. Each arresting member 22 is grooved to catch the edge of a chip or cake and momentarily hold the same, permitting the following food products to back up so that by the time the succeeding series of finger rises to the surface of the frying liquid a large quantity of the food products will have been collected by said member 22. The turn-over device is provided with a gear 23 fixed on its shaft 20 and driven from a gear underlying the same and operated from the roller 17.

In operation, the articles to be fried are dropped into the flowing steam of hot grease adjacent the corner 7. The grease being driven or impelled by the paddle wheel 8, carries the food product along the channel 4 until arrested by the upper most member 22 where they are held until turned over by the following fingers 21 after which they continue on with the current of grease until they are lifted out by the elevator belt 19. This belt being foraminous will readily permit of the hot grease draining from the food products and dripping back into the liquid body which continues flowing, being given added impetus by the paddle wheel. A single motor operates all the parts of the machine as is obvious from the foregoing. Since the paddle wheel is journaled above the surface of the grease there will be no cross currents tending to submerge the food product in the liquid body, as would be the case if the paddle wheel was submerged entirely within the grease. The machine is of simple construction and provides a continuous stream of frying or cooking liquid which carries the food products on its upper surface, said products being turned over midway of their travel to cook equally on opposite sides.

What I claim is:

1. A frying machine comprising a tank having a U-shaped partition wall therein and a T-shaped partition wall having the stem extending between the sides of the U-shaped wall and its cross-arm consisting of two arcuate sections extending across the ends of the U-shaped wall, a paddle wheel journaled between the bend of the U-shaped wall and the tank wall, a turn-over device journaled between the stem of the T-shaped wall and a side of the U-shaped wall, an elevator arranged between the U-shaped wall and the adjacent tank wall, and means for operating said paddle wheel, turn-over device and elevator.

2. In a frying machine, a tank having walls forming a substantially zig-zag channel which latter extends across an end of the tank, a paddle wheel journaled in said channel end and between said end of the tank and the adjacent channel-forming wall, an endless elevator having one end disposed adjacent to said end of the tank and having its opposite end extending across said end of the channel which extends across the end of the tank, a turn-over device mounted in approximately the center of the length of the channel, shafts on which the inner end of the conveyor and the turn-over device are mounted, a shaft on which the outer end of the conveyor is mounted, driving means between the paddle wheel and the shaft at the outer end of the conveyor to drive the latter and thereby the shaft at the inner end of the conveyor, means to operate the turn-over device, from the shaft at the inner end of the conveyor, and means to operate said driving means.

3. In a frying machine, a tank having walls forming a substantially zig-zag channel which latter extends across an end of the tank, a paddle wheel journaled in said channel end and between said end of the tank and the adjacent channel-forming wall, an endless elevator having one end disposed adjacent to said end of the tank and having its opposite end extending across said end of the channel which extends across the tank, and a turn-over device mounted in approximately the center of the length of the channel.

4. In a frying machine, a tank, means for impelling a stream of frying liquid in the tank, a turn-over device including series of oppositely extending radial fingers, and grooved arresting members, formed to engage the edge of the food being cooked, carried by the turn-over device.

In testimony whereof I affix my signature.

CHARLES T. SCHROYER.